United States Patent [19]
Snyder et al.

[11] Patent Number: 6,060,436
[45] Date of Patent: May 9, 2000

[54] DELAYED BORATE CROSSLINKED FRACTURING FLUID

[75] Inventors: Travis C. Snyder, Tahlequah, Okla.; Dustin L. Free; Stanley Bruce McConnell, both of Katy, Tex.; Brian R. Ainley, Broken Arrow, Okla.

[73] Assignee: Schlumberger Technology Corp., Sugar Land, Tex.

[21] Appl. No.: 08/692,756

[22] Filed: Aug. 6, 1996

Related U.S. Application Data

[63] Continuation of application No. 08/314,119, May 31, 1994, abandoned, which is a continuation of application No. 07/735,407, Jul. 24, 1991, abandoned.

[51] Int. Cl.[7] .............................. C09K 3/00; E21B 43/17
[52] U.S. Cl. ...................... 507/266; 507/273; 507/922; 507/924; 507/209; 507/211; 166/308
[58] Field of Search .................................. 507/266, 273, 507/922, 924, 211, 209; 166/308

[56] References Cited

U.S. PATENT DOCUMENTS

| | | | |
|---|---|---|---|
| 5,082,579 | 1/1992 | Dawson | 507/211 |
| 5,160,445 | 11/1992 | Sharif | 507/203 |
| 5,372,732 | 12/1994 | Harris et al. | 507/217 |
| 5,445,223 | 8/1995 | Nelson et al. | 166/308 |

*Primary Examiner*—Philip Tucker
*Attorney, Agent, or Firm*—John E. Vick, Jr., Esq.; Douglas Y'Barbo, Esq.

[57] ABSTRACT

The crosslinking of galactomannan gum fracturing fluids by borate ion is delayed for high temperature applications by completing boron in a basic solution with an organic polyol. Low pumping friction pressures are achieved by the delay in the crosslinking with the boron being available at high temperatures to add high temperature stability to the fracturing fluid at temperatures ranging upto about 300° F.

31 Claims, 1 Drawing Sheet

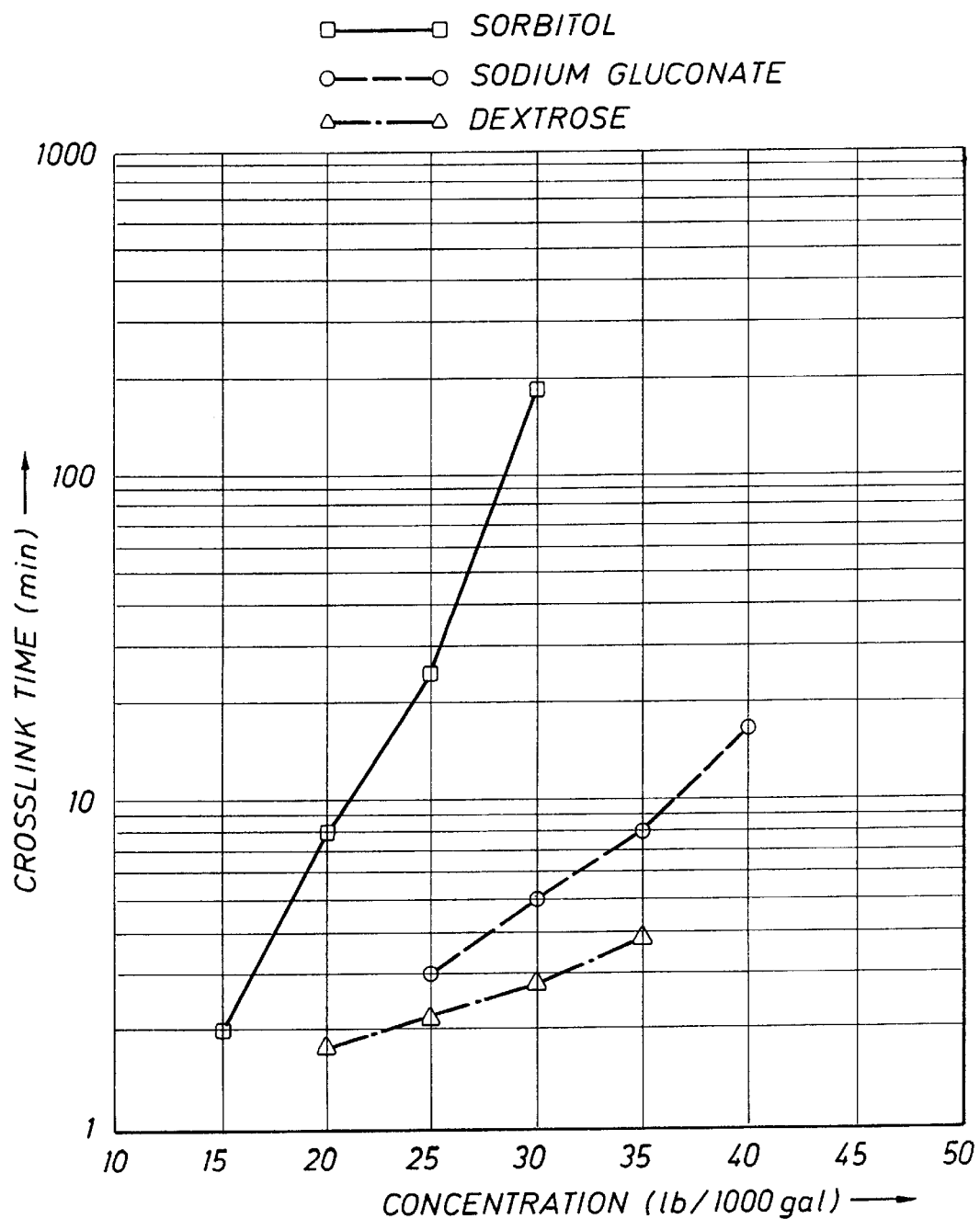

DELAYED BORATE CROSSLINKED FRACTURING FLUID

This is a continuation of application Ser. No. 08/314,119, filed on May 31, 1994 now abandoned, which is a continuation of application Ser. No. 07/735,407, filed on Jul. 24, 1991, now abandoned.

This invention relates to the art of recovery of hydrocarbon fluids from subterranean formations, and particularly, to a fracturing process and fluid used in such fracturing process.

BACKGROUND OF THE INVENTION

In the art of recovering hydrocarbon values from subterranean formations, it is common, particularly in formations of low permeability, to hydraulically fracture the hydrocarbon-bearing formation to provide flow channels to facilitate production of the hydrocarbons to the wellbore. Fracturing fluids typically comprise a water or oil base fluid incorporating a polymeric thickening agent. The polymeric thickening agent helps to control leak-off of the fracturing fluid into the formation, aids in the transfer of hydraulic fracturing pressure to the rock surfaces and, primarily, permits the suspension of particulate proppant materials which remain in place within the fracture when fracturing pressure is released.

Typical polymeric thickening agents for use in fracturing fluids comprise galactomannan gums such as guar and substituted guars such as hydroxypropyl guar or carboxymethylhydroxypropyl guar. Cellulosic polymers such as hydroxyethyl cellulose may also be used as well as synthetic polymers such as polyacrylamide. To increase the viscosity and, thus, the proppant carrying capacity as well as to increase the high temperature stability of the fracturing fluid, crosslinking of the polymers is also commonly practiced. Typical crosslinking agents comprise soluble boron, zirconium or titanium compounds. These metal ions provide for crosslinking or tying together of the polymer chains to increase the viscosity and improve the rheology of the fracturing fluid.

Of necessity, fracturing fluids are prepared on the surface and then pumped through tubing in the wellbore to the hydrocarbon-bearing subterranean formation. While high viscosity is a desirable characteristic of a fluid within the formation in order to efficiently transfer fracturing pressures to the rock as well as to reduce fluid leak-off, large amounts of hydraulic horsepower are required to pump such high viscosity fluids through the well tubing to the formation. In order to reduce the friction pressure, various methods of delaying the crosslinking of the polymers in a fracturing fluid have been developed. This allows the pumping of a relatively less viscous fracturing fluid having relatively low friction pressures within the well tubing with crosslinking being effected at or near the subterranean formation so that the advantageous properties of the thickened crosslinked fluid are available at the rock face.

One typical delayed crosslinking fracturing fluid system comprises borate crosslinked galactomannan gums such as guar or hydroxypropyl guar (HPG). The galactomannan polymers are generally provided to a blender in solid, powder form, or more typically, suspended in a hydrocarbon such as kerosene or diesel. When added to a neutral or acidic aqueous solution, the galactomannan gum hydrates to form a gel. Hydration of guar and HPG will only take place under neutral or acidic conditions, that is, at a pH of about 7 or less. Under these pH conditions, no crosslinking of guar or HPG will occur with borate ion. In order to effect borate crosslinking of guar and HPG, the pH must be raised to at least 9.5. It is this raising of the pH requirement which has been exploited in the prior art to effect a delay in the crosslinking of galactomannan gums by borate ion.

One typical mechanism for delaying the elevation of the pH is to use a low-solubility base such as magnesium oxide (MgO). MgO is added to the hydrated, acidic galacatomannan gum solution along with a boron releasing compound. Since the solution is initially acidic, there is no crosslinking of the polymers effected by the presence of boron (or borate ion) in solution. As the MgO slowly solubilizes in the system, the pH is gradually raised according to the following reaction:

$$MgO + H_2O \text{ yields } Mg^{+2} 2OH^- \qquad (1)$$

It is also been suggested that the solubilization of the MgO be further delayed by dispersing solid particulate MgO in hydrocarbon droplets with a surfactant which further slows the solubilization of the MgO. The borate crosslinking of a galactomannan gum is, however, a reversible reaction should the pH of the solution drop below the required pH of about 9.5 over a period of time. At temperatures of above about 200° F., magnesium ion combines with hydroxide ion to produce insoluble magnesium hydroxide which causes a lowering of the pH of the fracturing fluid, and which in turn, destabilizes the fluid through breaking of the borate crosslink. Thus, the use of borate crosslinked galactomannan gums in fracturing high temperature formations above about 200° F. is limited by the high pumping friction pressures required to pump a stable non-delayed borate-crosslinked fluid. The advantages of good clean up and removal of borate crosslinked galactomannan gums as well as their lower cost cannot be effectively employed above these temperatures.

SUMMARY OF THE INVENTION

The present invention provides a fracturing fluid and method of fracturing which allows the delay of borate crosslinking of a galactomannan gum fracturing fluid for use at temperatures well above the former 200° F. temperature limitation of prior art systems.

In accordance of the invention, a fracturing fluid for fracturing subterranean formations comprises an aqueous hydrated galactomannan gum solution and a crosslinking agent comprising an alkaline solution of a polyol complex of boron.

Further in accordance with the invention, the crosslinking agent includes polyols selected from a group consisting of glycols, glycerol, polyhydroxy saccharides and polysaccharides and acid, acid salt, ester and amine derivatives of such saccharides and polysaccharides.

Still further in accordance with the invention, a method of delaying boron crosslinking of an aqueous hydrated galactomannan gum fracturing fluid comprises the steps of providing an aqueous hydrated galactomannan gum fluid and adding a mixture of a boron-containing compound, an organic polyol complexing agent and a base whereby the boron-crosslinking of the galactomannan gum is effected following a delay in release of the boron from a complex with the polyol complexing agent.

Still further in accordance with the invention, a method of fracturing a subterranean formation comprises the steps of providing a hydrated galactomannan gum in aqueous solution, adding a crosslinking agent comprising an alkaline solution of a polyol complex of boron and pumping the combined solutions through well tubing to a subterranean formation at fracturing pressures.

It is therefore an object of this invention to provide a method for delaying the borate crosslinking of a galactomannan gum which is less affected by elevated subterranean temperatures.

It is yet another object of this invention to provide a fracturing fluid and method of fracturing which allows the use of borate crosslinked galactomannan gums at temperatures above 200° F.

BRIEF DESCRIPTION OF THE DRAWING

These and other objects of the invention are accomplished through the manner and form of the present invention to be described more fully hereinafter and in conjunction with the accompanying drawing forming a part of this specification and in which the sole FIGURE is a graphic illustration of the delay in the crosslink time at various concentration levels for exemplary boron complexing agents in accordance with the present invention.

DETAILED DESCRIPTION OF THE PREFERRED EMBODIMENTS AND THE DRAWINGS

The invention will now be more fully described in the more limited aspects of preferred embodiments thereof. It will be understood that such description does not in any way limit the scope of the invention described.

In accordance with the invention, the crosslinking of a galactomannan gum with borate ion is delayed by complexing boron in an aqueous alkaline solution using a complexing agent comprising an organic polyol in accordance with equilibrium reactions (2) below:

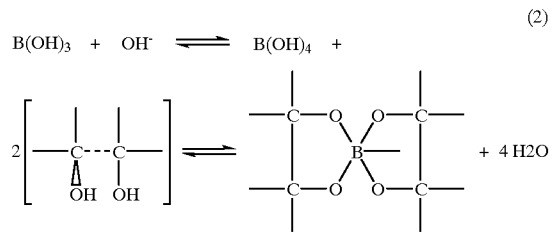

(2)

As used in this specification, the term "polyol" will be understood to mean an organic compound having adjacent alcohol functions as set forth in 3 below:

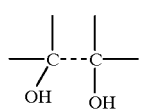

(3)

Thus, a polyol may comprise such materials as glycols, glycerin, saccharides such as glucose, sorbitol, dextrose, mannose, mannitol and the like as well as other carbohydrates and polysaccharides including natural and synthetic gums. Also included in the term "polyol" are acid, acid salt, ester and amine derivatives of a polyol.

The complex is formed by adding a base and a polyol to an aqueous solution of boric acid or other boron containing compound. Since reaction (2) is an equilibrium reaction, the materials may be added at least in a stoichiometric ratio or, more preferably, more alkaline material and/or more polyol may be added to form additional amounts of complexed boron. The more complexed boron present with the equilibrium reaction, the longer the crosslinking reaction of boron ion with a galactomannan gum is delayed. Those skilled in the art are easily capable of determining the various desired ratios of these three components in order to effect the desired delay time in the crosslinking reaction.

When sea water is used to makeup the fracturing fluid, i.e. when the base fluid in which the galactomannan gum is dispersed and hydrated is sea water, the solution comprising a boron-containing compound, a polyol and a base, of necessity includes a significantly larger amount of base in order to raise the pH of sea water at the elevated temperatures. Any common base such as an alkali metal or ammonium hydroxide or an alkaline earth metal hydroxide may be used to adjust the pH.

It is contemplated within the scope of the invention that the boron, the pH adjusting base and the complexing polyol be added to an aqueous hydrated galactomannan gum solution as a single additive solution although it is certainly possible to add these materials individually. In a preferred embodiment, a continuous mix or on-the-fly mixing procedure is followed wherein the galactomannan gum is supplied to the makeup water such as fresh water, brine or sea water and is passed through a continuous mixer allowing sufficient residence time for substantially complete hydration of the galactomannan gum followed by the addition of the delayed crosslinking agent as described above. The fracturing fluid is then in a condition to be pumped into the wellbore to the formation to be fractured either as a pad or with the addition of proppant material in normal loadings of up to sixteen or more pounds of proppant per gallon of fracturing fluid. As an hydrated galactomannan gum solution immediately prior to pumping.

The following examples illustrate several preferred embodiments of the invention showing various delay times in the crosslinking of a typical galactomannan gum fracturing fluid using several different types of polyol materials in accordance with the present invention.

EXAMPLE 1

A base fracturing fluid comprising forty pounds of guar per one thousand gallons of fracturing fluid was prepared and was allowed to hydrate. The fracturing fluid contained minor amounts of normal, nonactive (from the standpoint of crosslinking activity) fracturing fluid additives such as a surfactant, a biocide and a defoamer. This base fracturing fluid will be used in all subsequent examples made up, as stated, with either fresh water or sea water.

To this base fluid, five pounds of boric acid and four gallons of 30% sodium hydroxide solution both per thousand gallons of base fluid were mixed together and then added to the base fluid. Crosslinking of the guar was effected in a period of approximately 10 to 15 seconds.

EXAMPLE 2

To the base fluid of Example 1 made up with sea water, five pounds of boric acid, twenty-five pounds of sodium gluconate and four gallons of 30% sodium hydroxide solution (molar ratio 1:1.4:4) were mixed together and then added per thousand gallons base fluid. A delay in the crosslinking of the base fluid of three to four minutes was obtained.

EXAMPLE 3

Using the base fracturing fluid of Example 1 made up with sea water, five pounds of boric acid, thirty-six pounds of sodium gluconate and ten pounds of sodium hydroxide (molar ration 1:2:3) mixed together and then were added per thousand gallons of base fluid. A crosslinking delay time of approximately ten minutes was obtained.

EXAMPLE 4

Using the base fluid formulation of Example 1 made up with fresh water, a four minute crosslinking delay was achieved by adding a mixture of five pounds boric acid, thirty pounds glucose or dextrose and ten pounds of sodium hydroxide (molar ratio 1:2:3) per thousand gallons of base fluid.

A one hundred eighty minute delay in crosslinking was achieved with the addition of a mixture of five pounds boric acid, thirty pounds sorbitol and ten pounds sodium hydroxide all per thousand gallons of base fluid using fresh water in the base fluid of Example 1.

EXAMPLE 6

A three minute, delay in gel crosslinking was achieved with the addition of five pounds boric acid, fifteen pounds sorbitol and ten pounds sodium hydroxide (molar ratio 1:1:3) to a fresh water base fluid as used in Example 1.

The FIGURE illustrates additional testing in a forty pound per thousand gallons guar solution illustrating the various delay times with various amounts of several different polyol complexing agents such as is illustrated in the forgoing examples. From this FIGURE and the examples given, one skilled in the art can clearly select the desired delay time in the crosslinking action of the particular complexing agent. Crosslink delay times are chosen based on the pumping parameters of the fluid through the wellbore and, thus, vary with the pumping flow rate and the diameter and length of the well tubing. Typical desired delay times are in the range of 3–6 minutes.

The complexing of the borate using the polyol complexing agent of the present invention prevents syneresis at low mixing and pumping temperatures but allows the release of borate to effect crosslinking at high temperatures to give the fluid high temperature stability in a range of up to about 300° F. The complexing agent permits the formulation of high temperature system at low temperatures and the delay permits low pumping friction pressure during the pumping of the fracturing fluid to the formation with the desired crosslinking and its attendant viscosity and rheology benefits being available at high formation temperatures following fluid heat up in the formation.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of this invention as limited only by the appended claims.

Having thus described our invention we claim:

1. A fluid for fracturing a subterranean formation, said fluid prepared by the process consisting essentially of the steps of:

(a) providing an aqueous mixture of a hydrated galtomannan gum, (b) adding thereto a cross-linking agent for crosslinking said hydrated galactomannan gum at the conditions of said subterranean formation, said crosslinking agent comprising an alkaline solution of a polyol complex of boron, wherein the crosslinking agent is prepared by providing an aqueous solution of a boron-containing compound capable of releasing at least one borate ion per molecule of the compound in an alkaline solution, adding a first base to the aqueous solution of the boron-containing compound in a sufficient quantity to render the aqueous solution alkaline, adding a polyol to the aqueous solution, wherein the polyol is capable of complexing with it borate ion in an alkaline solution and is selected from a group consisting of polysaccahrides and hydrogenation acid and acid salt derivatives of saccharides and complexing the polyol with the borate ions released from the boron-containing compound in the aqueous solution which has been rendered alkaline by the first base, (c) pumping the aqueous mixture of the hydrated galactomannan gum and the cross-linking agent into a wellbore to the subterranean formation at fracturing pressures; and (d) crosslinking said hydrated galactomannan gum with borate ions released by said cross-linking agent at the conditions of said subterranean formation, wherein said fluid has an alkaline pH and said subterranean formation has a temperature greater than 200° F.

2. A fracturing fluid as set forth in claim 1 wherein the galactomannan gum comprises guar.

3. The fracturing fluid as set forth in claim 1 wherein the galactomannan gum comprises hydroxypropyl guar.

4. A method of delaying boron crosslinking of an aqueous, hydrated galactomannan gum fracturing fluid consisting essentially of the steps of:

a. providing an aqueous hydrated galactomannan gum fluid and b. adding to the hydrated galactomannan gum fluid a cross-linking agent for delaying the crosslinking of the hydrated galactomannan gum by borate ions under alkaline conditions, said crosslinking agent comprising an alkaline solution of a polyol complex of boron, wherein the crosslinking agent is prepared by (i) providing an aqueous solution of a boron-containing compound capable of releasing at least one borate ion per molecule of the compound in an alkaline solution, (ii) adding a first-base to the aqueous solution of the boron-containing compound in a sufficient quantity to render the aqueous solution alkaline;

(iii) adding a polyol to the aqueous solution wherein the polyol is capable of complexing with a borate ion in an alkaline solution and is selected from a group consisting of polysaccahrides and hydrogenation, acid and acid salt derivatives of saccharides, and (iv) complexing the polyol with the borate ions released from the boron-containing compound in the aqueous solution which has been rendered alkaline by the first base, (c) crosslinking the hydrated galactomannan gum with borate ions released by the crosslinking agent at the conditions of the subterranean formation, wherein the fluid has an alkaline pH and the subterranean formation has a temperature of at least 200° F., whereby the boron-crosslinking of the hydrated galactomannan gum is delayed by the release of borate ions by the crosslinking agent.

5. The method as set forth in claim 4 wherein the step of providing a hydrated galactomannan gum comprises providing a hydrated guar solution.

6. A method as set forth in claim 4 wherein the step of providing a hydrated galactomannan gum comprises providing a hydrated hydroxypropyl guar solution.

7. A method as set forth in claim 4 wherein in step (b) the polyol is sorbitol.

8. The fracturing fluid of claim 1, wherein the polyol is an acid salt derivative of a saccharide.

9. A method as set forth in claim 4 wherein in step (b) the polyol is sodium gluconate.

10. A method of fracturing a subterranean formation consisting essentially of the steps of:
   a. providing an aqueous hydrated galactomannan gum fluid;
   b. adding to the hydrated galactomannan gum fluid ingredients comprising
      i. a base in a sufficient amount to render the fluid alkaline,
      ii. a boron-containing compound capable of releasing at least one borate ion per molecule of the compound in an alkaline solution, and
      iii. a polyol capable of complexing with a borate ion in an alkaline solution and is selected from a group consisting of polysaccahrides and hydrogenation acid and acid salt derivatives of saccharides,
      iv. wherein a complex is formed between borate ions rleased by the boron-containing compound and the polyol, and
   c. pumping the galactomannan gum fluid with the ingredients added thereto in step b into a wellbore to the subterranean formation at fracturing pressures,
   d. wherein the subterranean formation has a temperature of at least 200° F.

11. The method as set forth in claim 10 further including the step of adding a particulate proppant material prior to the step of pumping.

12. The method as set forth in claim 10 wherein the step of providing a hydrated galactomannan gum comprises providing a hydrated guar solution.

13. A method as set forth in claim 10 wherein the step of providing a hydrated galactomannan gum comprises providing a hydrated hydroxypropyl guar solution.

14. A fluid for fracturing a subterranean formation, said fluid prepared by the process consisting essentially of the steps of:
   (a) providing an aqueous rum of a hydrated galactomanan gum, said gum capable of complexing with a borate ion in the alkaline fluid;
   (b) adding thereto ingredients comprising
      (i) a base in a sufficient amount to render the fluid in alkaline,
      (ii) a polyol wherein the polyol is selected from a group consisting of polysaccharides and hydrogenation acid and acid salt derivatives of saccharides, wherein the polyol is capable of complexing with a borate ion in the alkaline fluid,
      (iii) a boron-containing compound, wherein each molecule thereof is capable of releasing at least one borate ion in the alkaline fluid and wherein the compound is present in a sufficient amount to release a plurality of borate ions in the alkaline fluid,
      wherein a plurality of polyol complexes of boron are formed in the alkaline fluid between the polyol and the borate ions in the alkaline fluid; and
   (c) pumping the aqueous mixture of the hydrated galactomannan gum and the ingredients added in step (b) into a wellbore to the subterranean formation at fracturing pressures
   (d) crosslinking sad hydrated galactomannan gum with borate ions released by the plurality of polyol complexes of boron,
   wherein each of the plurality of polyol complexes of boron releases at least one borate ion to effect crosslinking of the gum at the conditions of the subterranean formation and
   wherein the subterranean formation has a temperature greater than 200° F.

15. The fracturing fluid of claim 14, wherein the polyol is a hydrogenation derivative of a saccharide.

16. The fracturing fluid of claim 15, wherein the hydrogenation derivative of a saccharide is a hydrogenation derivative of a monosaccharide.

17. The fracturing fluid of claim 16, wherein the hydrogenation derivative of a monosaccharide is selected from the group consisting of sorbitol and mannitol.

18. The fracturing fluid of claim 15, wherein the polyol is a polysaccharide.

19. The fracturing fluid of claim 14, wherein the polyol is an acid salt derivative of a saccharide.

20. The fracturing fluid of claim 19, wherein the acid salt derivative of a saccharide is sodium gluconate.

21. The fracture fluid according to claim 1, wherein the polyol is a hydrogenation derivative of a saccharide.

22. The fracturing fluid of claim 21, wherein the hydrogenation derivative of a saccharide is a hydrogenation derivative of a monosaccharide.

23. The fracturing fluid of claim 22, wherein the hydrogenation derivative of a monosaccharide is selected from the group consisting of sorbitol and mannitol.

24. The fracturing fluid of claim 1, wherein the polyol is a polysaccharide.

25. The fracturing fluid as set forth in claim 8, wherein the the acid salt derivative of a saccharide is an acid salt derivative of a monosaccharide.

26. The fracturing fluid as set forth in claim 25, wherein the acid salt derivative of a monosaccharide is sodium gluconate.

27. The method according to claim 10, wherein the step of adding ingredients comprises adding an aqueous solution of the boron-containing compound to which has been added the polyol and the base, wherein the base has been added in a sufficient quantity to render the aqueous solution alkaline and the complex is preformed in the aqueous solution.

28. The method according to claim 10, wherein the polyol is a hydrogenation derivative of a saccharide selected from the group consisting of sorbitol and mannitol.

29. The method according to claim 10, wherein the polyol is a polysaccharide.

30. The method according to claim 10, wherein the polyol is an aid salt derivative of a saccharide.

31. The method according to claim 30, wherein the acid salt derivative of a saccharide is sodium gluconate.

* * * * *